United States Patent
Kanesaka

[11] Patent Number: 5,835,250
[45] Date of Patent: Nov. 10, 1998

[54] DEVICE FOR DRIVING LIGHT EMITTING ELEMENT

[75] Inventor: Hiroki Kanesaka, Kawasaki, Japan

[73] Assignee: Fujitsu Limited, Kawasaki, Japan

[21] Appl. No.: 606,820

[22] Filed: Feb. 26, 1996

[30] Foreign Application Priority Data

Aug. 23, 1995 [JP] Japan ................................ 7-214976

[51] Int. Cl.[6] ................................................ H04B 10/04
[52] U.S. Cl. ................................ 359/183; 357/186
[58] Field of Search .......................... 359/180, 181, 359/184, 185, 186, 187, 183; 372/25, 26, 30, 31, 50

[56] References Cited

U.S. PATENT DOCUMENTS

| 4,523,089 | 6/1985 | Maeda et al. ............................ 250/205 |
| 4,803,384 | 2/1989 | Yamane et al. . |
| 4,813,048 | 3/1989 | Yamane et al. . |
| 4,816,699 | 3/1989 | Mori et al. . |
| 5,146,464 | 9/1992 | Uemura ..................................... 372/38 |
| 5,287,375 | 2/1994 | Fujimoto ................................... 372/38 |

OTHER PUBLICATIONS

Japanese Patent Laid Open No. 57–208738, Dec. 21, 1982 (Japanese Patent Appln. No. 56–94959, filed Jun. 18, 1981) & English translation of Title page and Claim 1.

Japanese Patent Laid Open No. 61–265884, Nov. 25, 1986 (Japanese Patent Appln. No. 60–108507, filed May 20, 1985) & English translation.

Japanese Patent Laid Open No. 62–286292, Dec. 12, 1987 (Japanese Patent Appln. No. 61–129639, filed Jun. 4, 1986) & English translation.

Japanese Patent Laid Open No. 63–828, Jan. 5, 1988 (Japanese Patent Appln. No. 61–144038, filed Jun. 20, 1986) & English translation of Title page and Claims 1–6.

Japanese Patent Laid Open No. 63–35032, Feb. 15, 1988 (Japanese Patent Appln. No. 61–179495, filed Jul. 30, 1986) & English translation of Title page and Claims 1–4.

*Primary Examiner*—Rafael Bacares
*Attorney, Agent, or Firm*—Staas & Halsey

[57] ABSTRACT

A device for driving a light emitting element, including a DC power source for generating a DC current, a signal driving unit for controlling, in an on-off manner, the DC current generated in the DC power source on the basis of signal data with timing in accordance with the signal data, a light emitting element which is driven by the DC current controlled in the on-off manner by the signal driving unit and emits light when the DC current flows thereto, a high-speed pulse controlling unit for controlling, in an on-off manner, the DC current which drives the light emitting element at a sufficiently short period in comparison with the signal data to pulse the DC current, and a driving control unit for controlling the timing of on-off control of the high-speed pulse controlling unit in accordance with a required mean optical output.

21 Claims, 11 Drawing Sheets

OPTICAL OUTPUT WAVEFORM → MEAN OPTICAL OUTPUT POWER

OPTICAL OUTPUT WAVEFORM → MEAN OPTICAL OUTPUT POWER 5,835,250

DEVICE FOR DRIVING LIGHT EMITTING ELEMENT

BACKGROUND OF THE INVENTION

The present invention relates to a device for driving a light emitting element which drives a light emitting element such as a laser diode, and specifically relates to a device for driving light emitting elements which is suitable as a signal source of an optical transmission system for carrying out a data transmission by light.

In the optical transmission system for carrying out the data transmission by an optical signal, a light emitting element such as a laser diode (referred to as "LD" hereinafter) is driven on the basis of an electric signal to generate an optical signal, and the optical signal is transmitted to an optical transmission path such as an optical fiber cable.

Up to the present, a LD driving device in the optical transmission system has been constructed as shown in FIG. 13.

The LD driving device shown in FIG. 13 comprises a LD (Laser Diode) 1, a photodiode (referred to as "PD" hereinafter) 2 for monitoring, a signal driving unit 3, a bias current driving unit 4, a mean value detection unit 5, a reference voltage generation unit 6, a comparator 7, a resistance 8 and a DC power source 9.

When the LD 1 emits light, the light is detected in the PD 2 for monitoring, an optical voltage corresponding to an optical intensity of the LD 1 is generated between terminals of the resistance 8, and a mean value of the optical voltage is obtained by the mean value detection unit 5. The reference voltage generation unit 6 generates a voltage which has been set up previously in accordance with a desirable mean output of optical output. The comparator 7 compares the mean value output of the mean value detection unit 5 with the output reference voltage of the reference voltage generation unit 6 to supply the signal driving unit 3 with a signal corresponding to the difference.

The signal driving unit 3, in an on-off manner, multiply-controls a DC voltage which is supplied to the LD 1 from the DC power source 9 and makes it function as a signal pulse current in accordance with a signal input of binary data to be transmitted (DATA IN), and controls an amplitude of the current supplied to the LD 1 in the ON state in accordance with the signal supplied from the comparator 7. At this moment, the signal driving unit 3 controls the current supplied to the LD 1 by increasing it so as to enlarge the mean value output, when the mean value output of the mean value detection unit 5 is smaller than the output reference voltage of the reference voltage generation unit 6, and controls the current supplied to the LD 1 by decreasing it so as to reduce the mean value output, when the mean value output is larger than the output reference voltage.

The bias current driving unit 4 lets a predetermined bias current flow into the LD 1 from the DC power source 9 and biases the current which drives the LD 1, even when the signal input is "0", namely, the signal driving unit 3 is in a OFF state. A temperature compensation signal is supplied to the bias current driving unit 4, and the bias current driving unit 4 controls the value of the predetermined bias current in accordance with the temperature.

In the LD driving device shown in FIG. 13, the LD 1 is driven by the current in which the signal pulse current is superimposed on the bias current, the signal pulse current is controlled so that the mean value of the output voltage of the PD 2 for monitoring is equal to the reference voltage, and the bias current is controlled so that it compensates a change by temperature of on-off threshold (current) of the LD 1 which generates the optical signal by the signal pulse current and the signal level is changed in the vicinity of the threshold all the time.

A level condition between the transmission and receiving in the optical transmission system varies depending on transmitting conditions such as a transmission distance. For instance, an optical output power of the LD of the transmission side is set up so as to meet the level condition between the transmission and receiving, when a dynamic range of the receiving side is restricted to the predetermined range. In a conventional LD driving device, the troubles such as deterioration of action waveform and deterioration of extinction ratio (light quantity ratio of lights-out/lighting-up) occur, because a small signal current is driven by relatively restricted amplitude in the vicinity of threshold current, if LD for high output is used in a low power without carrying out a temperature compensation by the bias current. For this reason, the LD and the driving circuit should be changed for each optical output power to be set up so as to make it possible to transmit a signal appropriately, and this fact causes an increase of the cost.

Besides, there is a problem in that the manhour are increased when the LD driving device is manufactured and used, because the data concerning the change of temperature of the threshold temperature current in a working temperature range is obtained beforehand for individual LD and the bias current is adjusted in accordance with the data, when the temperature compensation of the bias current is carried out. Further, divergence from the initial state due to a deterioration with the passage of time in the component/element of the LD driving device and the like is not compensated.

The present inventor has found that the problems mentioned above can be solved by controlling the DC current which drives the light emitting element in the high-speed pulse and controlling the timing of the on-off control of the pulse in accordance with the mean optical output, or coordinating the control of the bias current driving unit and the control of the signal driving unit, or by the both, and has thus accomplished the present invention.

SUMMARY OF THE INVENTION

An object of the present invention is to provide a device for driving a light emitting element which is capable of driving the light emitting element such as the LD appropriately for the various output powers and makes it possible to apply the light emitting element for high output to uses for low output.

In a first aspect of the present invention, it is provided a device for driving a light emitting element, which comprises:

a DC power source for generating a DC current;

a signal driving unit for controlling, in an on-off manner, the DC current generated in the DC power source on the basis of a signal data with timing in accordance with the signal data;

a light emitting element which is driven by the DC current controlled in the on-off manner by the signal driving unit and emits light when the DC current flows thereto;

a high-speed pulse controlling unit for controlling, in an on-off manner, the DC current which drives the light emitting element at a sufficiently short period in comparison with the signal data to pulse the DC current; and a driving control unit for controlling the timing of on-off control of said high-speed pulse controlling unit in accordance with a required mean optical output.

The high-speed pulse controlling unit may pulse the DC current which drives the light emitting element by controlling, in an on-off manner, the DC current which is supplied to the signal driving unit from the DC power source at the sufficiently short period in comparison with the signal data to pulse the DC current.

The high-speed pulse controlling unit may pulse the DC current which drives the light emitting elements by controlling, in an on-off manner, the DC current which is supplied to the light emitting element from the signal driving unit at the sufficiently short period in comparison with the signal data to pulse the DC current.

The signal driving unit may control, in an on-off manner, the DC current on the basis of the signal data, at an amplitude and with timing in accordance with the signal data.

The driving control unit may include a pulse width controlling unit for controlling variably a pulse width duty ratio of the high-speed pulse controlling unit to pulse the DC current.

The driving control unit may include a pulse pattern controlling unit for controlling variably a pulse pattern of the high-speed pulse controlling unit to pulse the DC current.

The pulse pattern controlling unit may include a pulse density controlling unit for selecting and extracting intermittently a pulse in a high frequency pulse line formed by the high-speed pulse controlling unit, and controlling variably a pulse density of the pulse to be extracted to pulse the DC current.

The pulse pattern controlling unit may include a pulse number controlling unit for selecting and extracting intermittently a pulse in a high frequency pulse line formed by the high-speed pulse controlling unit at a predetermined period, and changing variably a pulse number of the pulse to be extracted per period to pulse the DC current.

The device of the present invention may further comprise a light receiving element for detecting an optical output of the light emitting element, a mean value detection unit for detecting a mean value of the output of the light receiving element and a comparison unit for comparing the mean value with a reference value, and the driving control unit may control the high-speed pulse controlling unit in accordance with a comparison result of the comparison unit.

The device of the present invention may further comprise a light receiving element for detecting an optical output of the light emitting element, a peak value detection unit for detecting a peak value of the output of the light receiving element and a comparison unit for comparing the peak value with a reference value, and the signal driving unit may control the amplitude of the DC current which is supplied to the light emitting element in accordance with the comparison result of the comparison unit.

Further, a bias current driving unit for supplying a predetermined bias current to the light emitting element from the DC power source regardless of the action of the signal driving unit and the driving control unit may be included in the device of the present invention.

The bias current driving unit may control variably a bias current in accordance with a temperature compensation signal.

The device of the present invention may further comprise a light receiving element for detecting an optical output of the light emitting element, a mean value detection unit for detecting a mean value of the output of the light receiving element, a peak value detection unit for detecting a peak value of the output of the light receiving element, a first reference value generation unit for generating a predetermined first reference value, a first comparison unit for comparing the peak value with the first reference value, a bias current driving unit for supplying a predetermined bias current to the light emitting element from the DC power source regardless of the action of the signal driving unit and the driving control unit, in accordance with the comparison result of the first comparison unit, a ½ (half) calculation unit for calculating a ½ (half) peak value corresponding to the ½ (half) of the peak value, a second reference value generation unit for adding a predetermined second reference value to the ½ (half) peak value and a second comparison unit for comparing the mean value with the ½ (half) peak value to which the second reference value has been added, and the signal driving unit may control the amplitude of the DC current which is supplied to the light emitting element in accordance with the comparison result of the second comparison unit.

The driving control unit may control the high-speed pulse controlling unit in accordance with a controlling signal supplied from the outside.

In a second aspect of the present invention, it is provided a device for driving a light emitting element, which comprises:

a DC power source for generating a DC current;

a signal driving unit for controlling, in an on-off manner, the DC current generated in the DC power source on the basis of a signal data, at an amplitude and with timing in accordance with the signal data;

a light emitting element which is driven by the DC current controlled in the on-off manner by the signal driving unit and emits light when the DC current flows thereto;

a light receiving element for detecting an optical output of the light emitting element;

a mean value detection unit for detecting a mean value of the output of the light receiving element;

a peak value detection unit for detecting a peak value of the output of the light receiving element;

a first reference value generation unit for generating a predetermined first reference value;

a first comparison unit for comparing the peak value with the first reference value;

a bias current driving unit for supplying a predetermined bias current to the light emitting element from the DC power source regardless of the action of the signal driving unit, in accordance with the comparison result of the first comparison unit;

a ½ (half) calculation unit for calculating a ½ (half) peak value corresponding to the ½ (half) of the peak value;

a second reference value generation unit for adding a predetermined second reference value to the half peak value; and a second comparison unit for comparing the mean value with the half peak value to which the second reference value has been added and controlling the signal driving unit in accordance with the comparison result to make the amplitude of the DC current which is supplied to the light emitting element as a value corresponding to the comparison result.

The light emitting element may be a laser diode.

The light receiving element may be a photodiode.

The device for driving the light emitting element of the present invention constructed in the above-mentioned way is capable of driving the light emitting element such as the LD appropriately for the various output powers without controlling the peak value of the driving current, and the light emitting element for high output can be applied to uses for the low output.

For instance, the mean optical output power can be changed without changing the peak value of the driving current by controlling, in an on-off manner, the driving current when the light emitting element such as the LD emits light, as the pulse of sufficiently quick period in comparison with the transmission speed, and by controlling variably the pulse width duty or the pulse number per unit time. At this moment, in the receiving side, the waveform in which the on-off output of the pulse is averaged as a receiving output can be obtained by setting up a frequency band of an amplifier of the receiving signal in the period less than the on-off period of the pulse. By these actions, the mean output power can be set up in a wide range by using one kind of LD and driving circuit, and the LD and the driving circuit can be generalized in the system of various conditions. Besides, the mean output power can be controlled from the outside by changing the pulse width or the pulse number according to the controlling signal supplied from the outside.

When the driving current of the light emitting element such as the LD is larger than the threshold, the driving current is related almost linearly to the output voltage of the PD for monitoring. In many cases, the relationship between the driving current and the output voltage of the PD for monitoring is nonlinear, if the driving current is reduced to be brought close to the threshold current. Further, the output voltage of the PD for monitoring is almost fixed, if the driving current is not more than the threshold current. The bias current can be kept in the vicinity of the threshold current automatically even when the threshold current is changed by temperature, if the microscopic current state in the vicinity of the nonlinear part is detected.

DETAILED DESCRIPTION OF THE INVENTION

Figure 1:
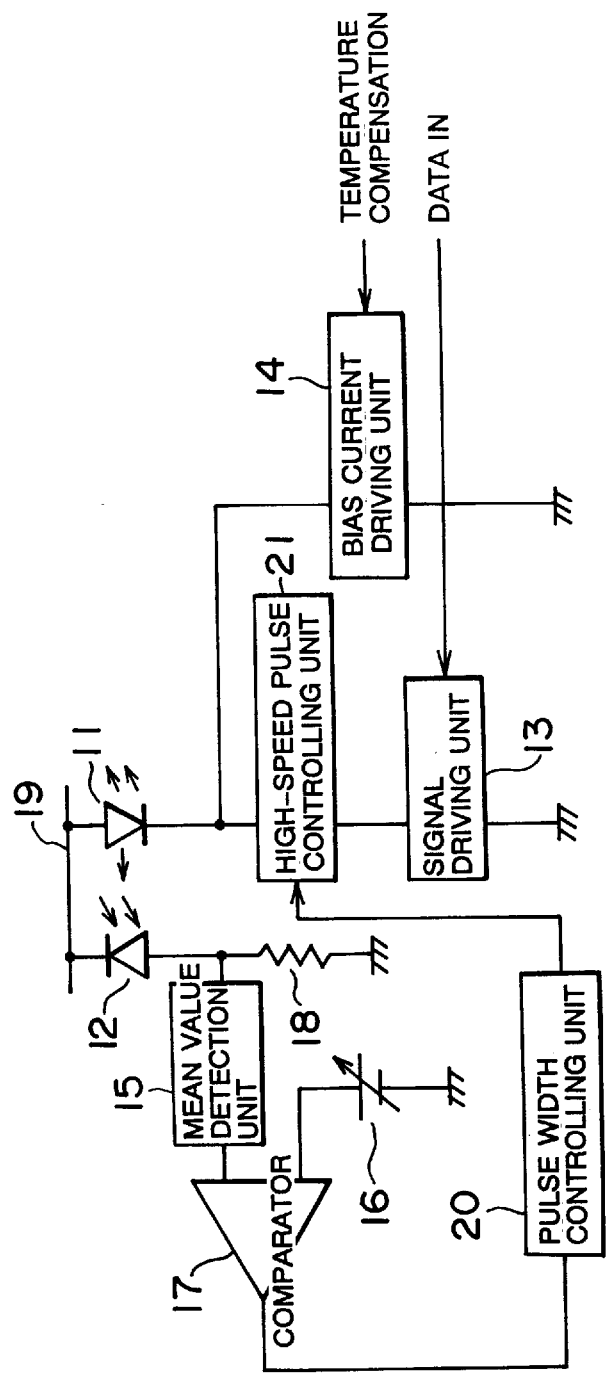
FIG. 1 is a block diagram indicating a construction of a device for driving a light emitting element of the first embodiment of the present invention.

The embodiments of the device for driving the light emitting element of the present invention will be described by referring to the drawings as follows.

[EMBODIMENT 1]

FIG. 1 indicates the construction of the first embodiment of the LD driving device to which the device for driving the light emitting element according to the present invention has been applied.

The LD driving device shown in FIG. 1 comprises a LD (Laser Diode) 11, PD (PhotoDiode) 12 for monitoring, a signal driving unit 13, a bias current driving unit 14, a mean value detection unit 15, a reference voltage generation unit 16, a comparator 17, a resistance 18, a DC power source 19, a pulse width controlling unit 20 and a high-speed pulse controlling unit 21.

The LD 11 is a LD which functions as a light emitting element driven by the current, and the PD 12 for monitoring is a PD which functions as a light receiving element for monitoring the emission of the LD 11.

The signal driving unit 13 drives, in an on-off manner, the current which is supplied from the DC power source 19 so as to drive the LD 11 in accordance with the signal data input (DATA IN) supplied from the outside. The signal data is binary data to be transmitted. It also can be thought that the signal driving unit 13 multiplies the current which is supplied to the LD 11 from the DC power source 19 by the signal data of "1"/"0", namely, "H"/"L".

The bias current driving unit 14 biases the current which is supplied to the LD 11 from the DC power source 19 by a predetermined bias value and controls variably the predetermined bias value in accordance with the temperature compensation signal which is supplied from the outside so as to compensate a temperature characteristic. Specifically, the bias current driving unit 14 superimposes the bias current of the predetermined bias value on the current which is supplied to the LD 11 from the DC power source 19, and increases and decreases the bias current in accordance with the temperature compensation signal supplied from the outside.

The mean value detection unit 15 detects a mean value of the voltage corresponding to the light emitting intensity of the LD 11 which is detected by the PD 12 for monitoring and appears between the terminals of the resistance 18, and supplies it to the comparator 17.

The reference voltage generation unit 16 generates a reference voltage corresponding to the desired mean value. The comparator 17 compares the reference voltage obtained in the reference voltage generation unit 16 with the mean value obtained in the mean value detection unit 15 and supplies the comparison result to the pulse width controlling unit 20. The comparison unit is formed by the reference voltage generation unit 16 and the comparator 17.

The pulse width controlling unit 20 is a driving control unit for controlling the high-speed pulse controlling unit 21 in response to the output of the comparator 17.

The high-speed pulse controlling unit 21 controls, in an on-off manner, the current which is supplied to the LD 11 from the DC power source 19 at the sufficiently short period in comparison with the signal data so as to pulse the current. In the high-speed pulse controlling unit 21, the pulse width duty ratio of the pulse line is controlled variably by the pulse width controlling unit 20.

The action of the LD driving device shown in FIG. 1 will be described concretely.

When the LD 11 emits light, the light of the LD 11 is detected by the PD 12 for monitoring, and the optical voltage corresponding to the optical intensity of the LD 11 occurs between the terminals of the resistance 18. The mean value of the optical voltage is calculated in the mean value detection unit 15. The reference voltage which has been set up previously in accordance with the desired mean output of the optical output is generated in the reference voltage generation unit 16. The mean value output of the mean value detection unit 15 is compared with the output reference voltage of the reference voltage generation unit 16 in the comparator 17, and the signal corresponding to the difference is supplied to the pulse width controlling unit 20.

The current which is supplied to the LD 11 from the DC power source 19 is controlled in an on-off manner to be pulsed by the high-speed pulse controlling unit 21 at the sufficiently short period in comparison with the signal data of the binary data to be transmitted. At the same time, the signal driving unit 13 in an on-off manner, multiply-controls the DC current which is supplied to the LD 11 through the high-speed pulse controlling unit 12 and makes it function as a signal pulse current.

Figure 2:
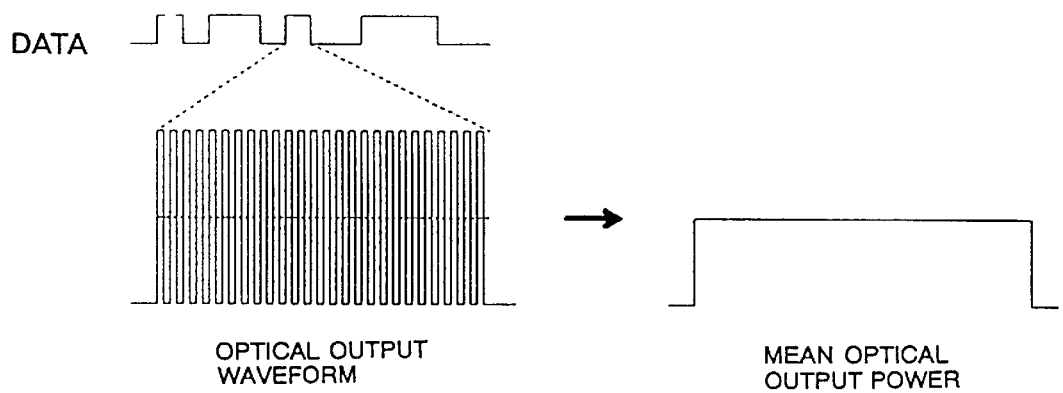
FIG. 2 is a signal waveform diagram for explaining the action of the device shown in FIG. 1.
Figure 3:
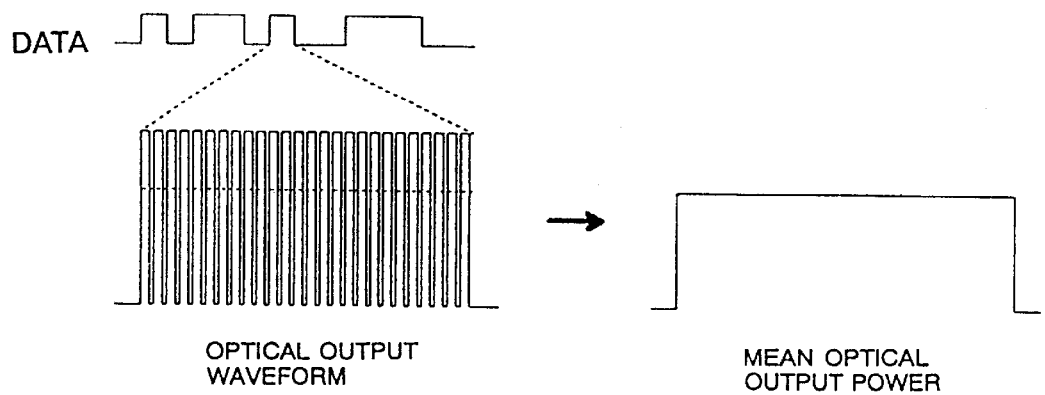
FIG. 3 is a signal waveform diagram for explaining the action of the device shown in FIG. 1.

As shown in FIG. 2, when the mean value output of the mean value detection unit 15 is larger than the output reference voltage of the reference voltage generation unit 16, the pulse width controlling unit 20 controls the high-speed pulse controlling unit 21 so that an on-duty of the pulse width is decreased, in order to decrease the mean value of the current supplied to the LD 11 to reduce the mean value output. As shown in FIG. 3, when the mean value output is smaller than the output reference voltage, the pulse width controlling unit 20 controls the high-speed pulse controlling unit 21 so that the on-duty of the pulse width is enlarged, in order to increase the mean value of the current supplied to the LD 11 to enlarge the mean value output.

The bias current driving unit 14 lets the predetermined bias current flow into the LD 11 from the DC power source 19 and biases the current which drives the LD 11, even when the signal input is "0", namely, the signal driving unit 13 is in a OFF state. The temperature compensation signal is supplied to the bias current driving unit 14 so that the value of the predetermined bias current is controlled in accordance with the temperature.

As mentioned hereinbefore, the LD driving device shown in FIG. 1 is provided with the high-speed pulse controlling unit 21 and the pulse width controlling unit 20 for controlling the pulse width, and the mean optical output power of the LD 11 can be kept at the value which has been set up previously, without controlling the peak value of the driving current of the LD 11, by controlling, in an on-off manner, the light emitting element at the pulse of sufficiently quick period in comparison with the driving current based on the signal data input when the LD 11 emits light, and controlling the pulse width duty so that the mean value of the voltage based on the output of the PD 12 for monitoring is equal to the reference voltage.

Namely, the mean optical output power can be changed without changing the peak value of the driving current, by controlling, in an on-off manner, the driving current when the LD 11 emits light at the pulse of sufficiently quick period in comparison with the signal transmission speed and controlling variably the pulse width duty of the driving current. Further, in this case, in the receiving side, the waveform in which the on-off output of the pulse has been averaged as a receiving output can be obtained by setting up the frequency band of the amplifier of the receiving signal in the period less than the on-off period of the pulse. By these actions, the mean output power can be set up in a wide range by using the same kind of LD 11 and driving circuit, and the LD 11 and the driving circuit can be generalized in the system of various conditions.

Figure 4:
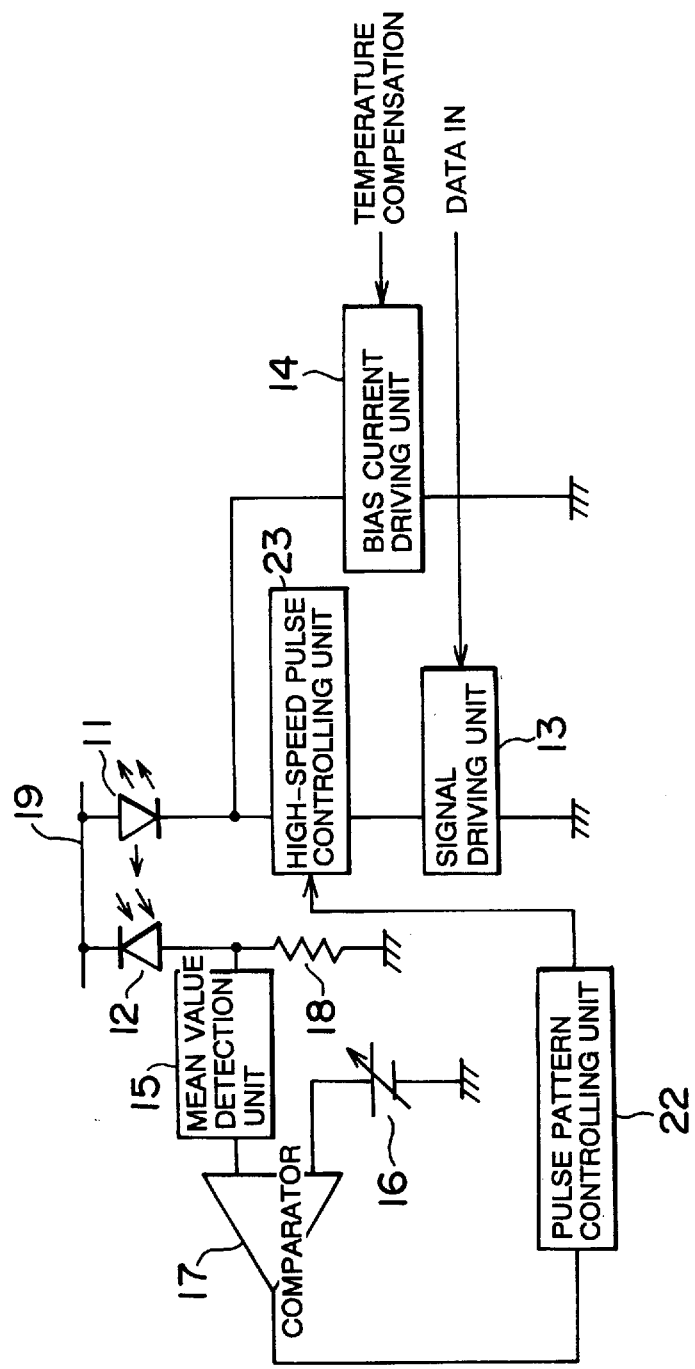
FIG. 4 is a block diagram indicating a construction of a device for driving a light emitting element of the second embodiment of the present invention.

FIG. 4 indicates a construction of the second embodiment of the LD driving device to which the device for driving the light emitting element according to the present invention has been applied.

In FIG. 4, the detailed descriptions concerning the same parts as those of FIG. 1 will be omitted by giving the identical numbers to them. Namely, in the LD driving device shown in FIG. 4, a LD 11, a PD 12 for monitoring, a signal driving unit 13, a bias current driving unit 14, a mean value detection unit 15, a reference voltage generation unit 16, a comparator 17, a resistance 18 and a DC power source 19 are the same as those of FIG. 1. Further, the LD driving device shown in FIG. 4 is provided with a pulse pattern controlling unit 22 and a high-speed pulse controlling unit 23 respectively instead of the pulse width controlling unit 20 and the high-speed pulse controlling unit 21 shown in FIG. 1.

The comparator 17 compares the reference voltage obtained in the reference voltage generation unit 16 with the mean value obtained in the mean value detection unit 15 and supplies the comparison result to the pulse pattern controlling unit 22. The comparison unit is formed by the reference voltage generation unit 16 and the comparator 17.

The pulse pattern controlling unit 22 is a driving control unit for controlling the high-speed pulse controlling unit 23 in response to the output of the comparator 17.

The high-speed pulse controlling unit 23 controls, in an on-off manner, the current which is supplied to the LD 11 from the DC power supply 19 at the sufficiently short period in comparison with the signal data to pulse the current. In the high-speed pulse controlling unit 23, the pulse line is outputted intermittently at the period which is longer than the pulse period and is sufficiently short in comparison with the signal data, and the pulse number for every period is controlled variably by the pulse pattern controlling unit 22.

The action of the LD driving device shown in FIG. 4 will be described concretely.

When the LD 11 emits light, the light of the LD 11 is detected by the PD 12 for monitoring, and the optical voltage corresponding to the optical intensity of the LD 11 is generated between the terminals of the resistance 18. The mean value of the optical voltage is obtained in the mean value detection unit 15. The reference voltage which has been set up previously in accordance with the desired mean output of the optical output is generated in the reference voltage generation unit 16. The mean value output of the mean value detection unit 15 is compared with the output reference voltage of the reference voltage generation unit 16 in the comparator 17, and the signal corresponding to the difference is supplied to the pulse pattern controlling unit 22.

The current which is supplied to the LD 11 from the DC power source 19 is controlled, in an on-off manner to be pulsed by the high-speed pulse controlling unit 23 at the a sufficiently short period in comparison with the signal data of the binary data to be transmitted. At the same time, the signal driving unit 13 in an on-off manner, multiply-controls the DC current which is supplied to the LD 11 through the high-speed pulse controlling unit 23 from the DC power source 19 in accordance with the signal data input to be transmitted, and makes it function as a signal pulse current.

Figure 5:
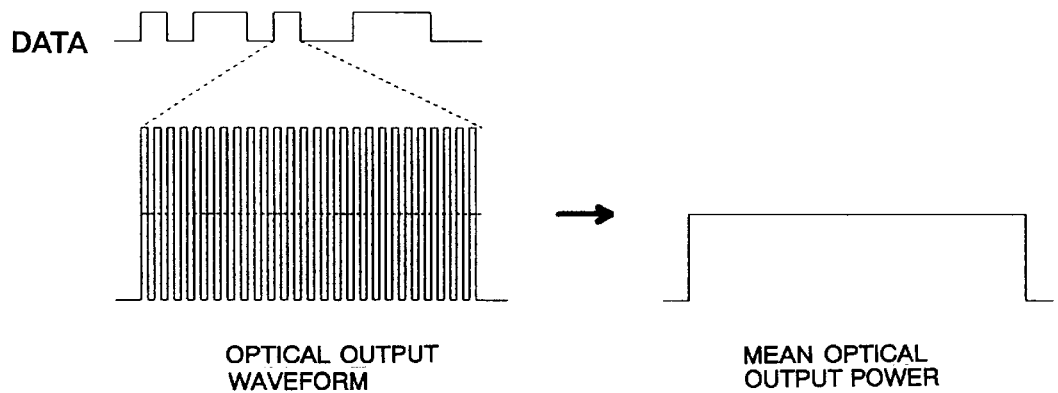
FIG. 5 is a signal waveform diagram for explaining the action of the device shown in FIG. 4.
Figure 6:
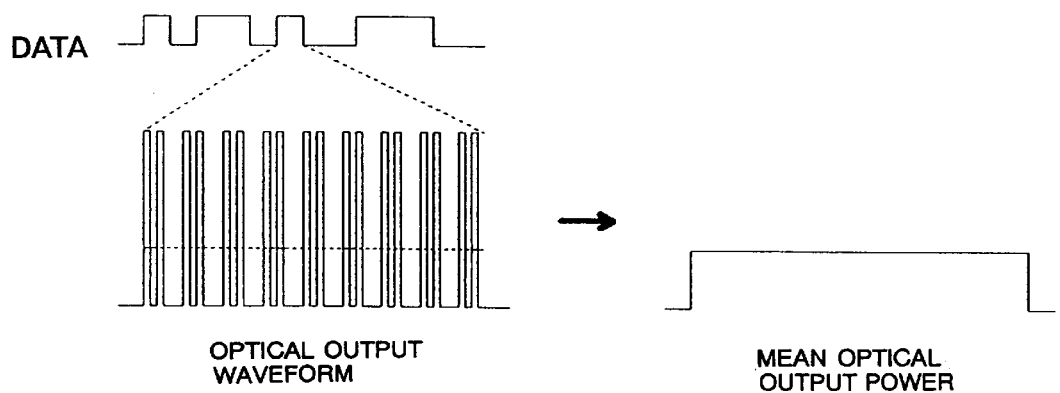
FIG. 6 is a signal waveform diagram for explaining the action of the device shown in FIG. 4.

As shown in FIG. 5, when the mean value output of the mean value detection unit 15 is smaller than the output reference voltage of the reference voltage generation unit 16, the pulse pattern controlling unit 22 controls the high-speed pulse controlling unit 23 so that the pulse number per unit time is increased, in order to enlarge the mean value of the current which is supplied to the LD 11 so as to enlarge the mean value output. As shown in FIG. 6, when the mean value output is larger than the output reference voltage, the pulse pattern controlling unit 22 controls the high-speed pulse controlling unit 23 so that the pulse number per unit time is decreased, in order to decrease the mean value of the current which is supplied to the LD 11 so as to reduce the mean value output. In this case, as shown in FIG. 5, the intermittent pulse line actually functions as a successive pulse line at the maximum state, if the pulse number per period of the intermittent pulse line is increased.

The bias current driving unit 14 lets the predetermined bias current flow into the LD 11 from the DC power source 19 and biases the current which drives the LD 11, even when the signal input is "0", namely, the signal driving unit 13 is in the OFF state. The temperature compensation signal is supplied to the bias current driving unit 14 so that the value of the predetermined bias current is controlled in accordance with the temperature.

As mentioned hereinbefore, the LD driving device shown in FIG. 4 is provided with the high-speed pulse controlling unit 23 and the pulse pattern controlling unit 22 for controlling the pulse number per unit time, and the mean optical output power of the LD 11 can be kept in the value which has been set up previously without controlling the peak value of the driving current of the LD 11, by controlling, in an on-off manner, the light emitting element at the pulse of sufficiently short period in comparison with the driving current based on the signal data input when the LD 11 emits light, and controlling the pulse density of the pulse line so that the mean value of the voltage based on the output of the PD 12 for monitoring is equal to the reference voltage.

Namely, the mean optical output power can be changed without changing the peak value of the driving current, by controlling, in an on-off manner, the driving current when the LD 11 emits light, at the pulse of sufficiently short period in comparison with the signal transmission speed, and controlling variably the pulse density according to the control of the pulse number of the intermittent pulse line (for instance, the control of the pulse number while the LD 11 emits light). Further, in this case, in the receiving side, the waveform in which the on-off output of the pulse has been averaged as a receiving output can be obtained by setting up the frequency band of the amplifier of the receiving signal in the period less than the on-off period of the pulse. By these actions, the mean output power can be set up in a wide range by using the same kind of LD 11 and driving circuit, and the LD 11 and the driving circuit can be generalized in the system of various conditions.

As a matter of course, the thinning-out rate of the pulse line may be merely controlled, because the control of the pulse density of the pulse whose pulse width is fixed is sufficient to control the mean output.

Figure 7:
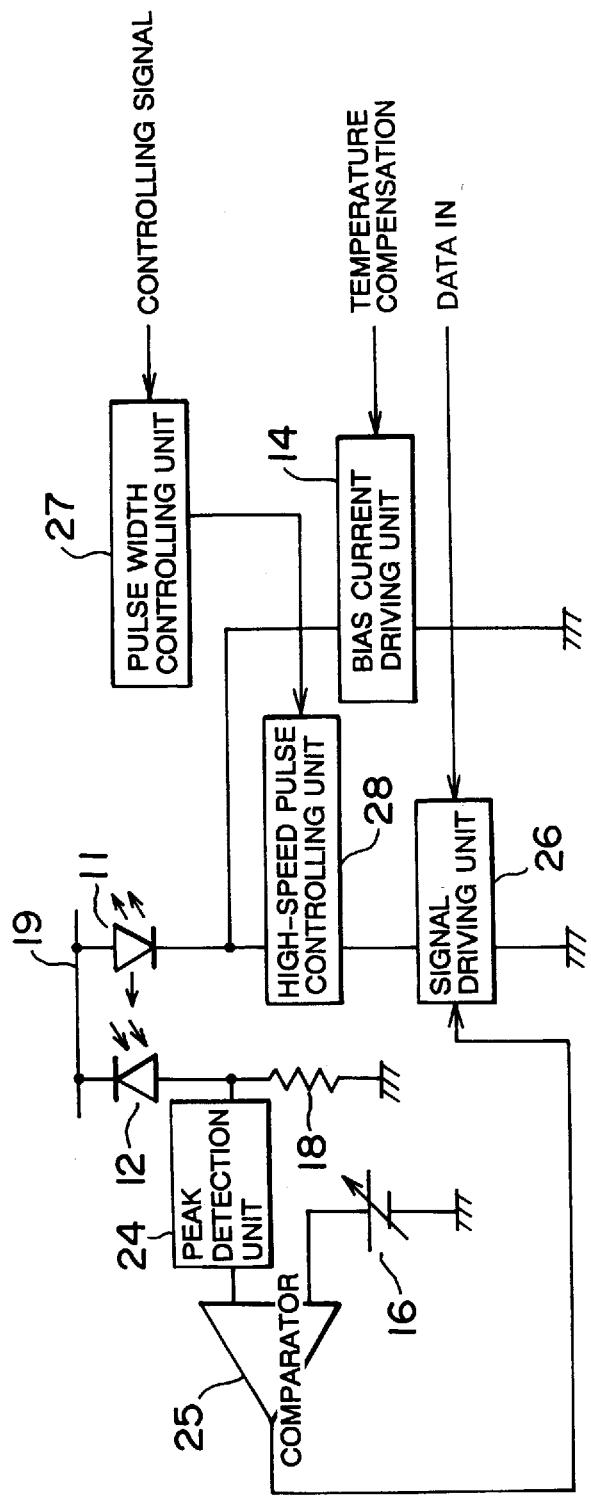
FIG. 7 is a block diagram indicating a construction of a device for driving a light emitting element of the third embodiment of the present invention.

FIG. 7 indicates a construction of the third embodiment of the LD driving device to which the device for driving the light emitting element according to the present invention has been applied.

In FIG. 7, the detailed descriptions concerning the same parts as those of FIG. 1 and FIG. 4 will be omitted by giving the identical numbers to them. Namely, in the LD driving device shown in FIG. 7, a LD 11, a PD 12 for monitoring, a bias current driving unit 14, a reference voltage generation unit 16, a resistance 18 and a DC power source 19 are the same as those of FIG. 1 and FIG. 4. Further, the LD driving device shown in FIG. 4 comprises a peak detection unit 24, a comparator 25, a signal driving unit 26, a pulse width controlling unit 27 and a high-speed pulse controlling unit 28.

The signal driving unit 26 drives, in an on-off manner, the current supplied from the DC power source 19 in accordance with the signal data input so as to drive the LD 11. In this case, the signal driving unit 26 controls the amplitude of the driving current for the LD 11 in accordance with the signal supplied from the comparator 25. The peak detection unit 24 detects the peak value of the voltage corresponding to the light emitting intensity of the LD 11 which is detected by the PD 12 for monitoring and appears between the terminals of the resistance 18, and supplies it to the comparator 25.

In this case, the reference voltage generation unit 16 generates the reference voltage corresponding to the desired peak value. The comparator 25 compares the reference voltage obtained in the reference voltage generation unit 16 with the mean value obtained in the peak detection unit 24, and supplies the comparison result to the signal driving unit 26. The comparison unit is formed by the reference voltage generation unit 16 and the comparator 25.

Accordingly, the signal driving unit 26 controls the peak value of the voltage corresponding to the light emitting intensity of the LD 11 which is detected by the PD 12 for monitoring and appears between the terminals of the resistance 18, so as to conform the peak value to the reference voltage of the reference voltage generation unit 16.

The pulse width controlling unit 27 is a driving control unit for controlling the high-speed pulse controlling unit 28 in response to the controlling signal inputted from the outside. The high-speed pulse controlling unit 28 controls, in an on-off manner, the current which is supplied to the LD 11 from the DC power source 19 at the sufficiently short period in comparison with the signal data to pulse the current. In the high-speed pulse controlling unit 28, the pulse width duty ratio of the pulse line is controlled variably by the pulse width controlling unit 27.

The action of the LD driving device shown in FIG. 7 will be described concretely.

When the LD 11 emits light, the light of the LD 11 is detected by the PD 12 for monitoring and the optical voltage corresponding to the optical intensity of the LD 11 is generated between the terminals of the resistance 18. The peak value of the optical voltage is obtained in the peak detection unit 24. The reference voltage which has been set up previously in accordance with the desired peak output of the optical output is generated in the reference voltage generation unit 16. The peak value output of the peak detection unit 24 is compared with the output reference voltage of the reference voltage generation unit 16 in the comparator 25, and the signal corresponding to the difference is supplied to the signal driving unit 26.

The current which is supplied to the LD 11 from the DC power source 19 is controlled in an on-off manner to be pulsed by the high-speed pulse controlling unit 28 at the sufficiently short period in comparison with the signal data of the binary data to be transmitted. In the high-speed pulse controlling unit 28, the pulse width duty is controlled variably by the pulse width controlling unit 27. The pulse width controlling unit 27 operates in accordance with the controlling signal supplied from the outside. The required mean output power is determined by the controlling signal.

The signal driving unit 26 controls in an on-off manner, namely, multiply-controls the DC current which is supplied to the LD 11 through the high-speed pulse controlling unit 28 from the DC power source 19 in accordance with the signal data input to be transmitted, and makes it function as a signal pulse current. The signal driving unit 26 controls the amplitude of the current supplied to the LD 11 so as to decrease it and reduce the mean value output, when the peak value output of the peak detection unit 15 is larger than the output reference voltage of the reference voltage generation unit 16. The signal driving unit 26 controls the amplitude of the current supplied to the LD 11 so as to increase it and enlarge the mean value output, when the peak value output is smaller than the output reference voltage.

As mentioned hereinbefore, the LD driving device shown in FIG. 7 comprises the peak detection unit 24, the comparator 25, the signal driving unit 26, the pulse width controlling unit 27 and the high-speed pulse controlling unit 28, and the mean optical output power of the LD 11 can be kept at the value which has been set up previously, by controlling, in an on-off manner, the light emitting element at the pulse of the sufficiently quick period in comparison with the driving current based on the signal data input when the LD 11 emits light and controlling the pulse width duty of the pulse, and the mean output of the LD 11 can be kept at the fixed output by controlling the amplitude of the driving current of the LD 11 in accordance with the result obtained by comparing the peak value of the output of the PD 12 for monitoring with the reference value.

Figure 8:
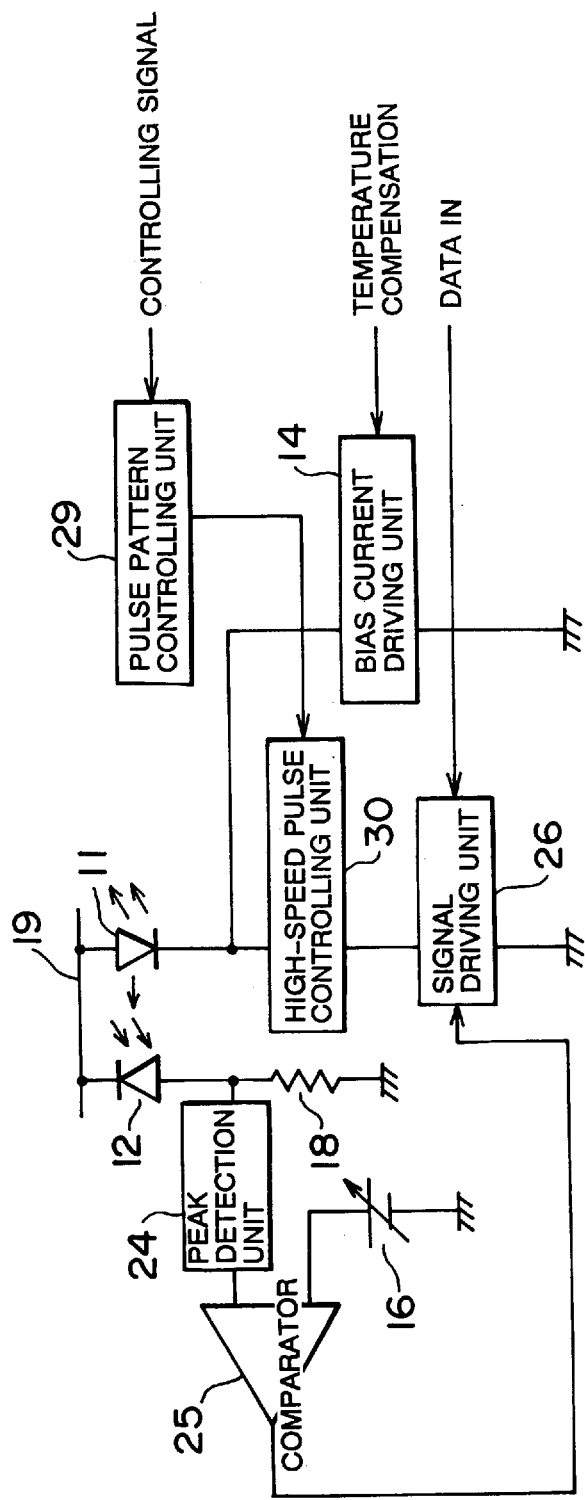
FIG. 8 is a block diagram indicating a construction of a device for driving a light emitting element of the fourth embodiment of the present invention.

FIG. 8 indicates a construction of the fourth embodiment the LD driving device to which the device for driving a light emitting element according to the present invention has been applied.

In FIG. 8, the detailed descriptions concerning the same parts as those of FIG. 7 will be omitted by giving the identical numbers to them. Namely, in the LD driving device shown in FIG. 8, a LD 11, a PD 12 for monitoring, a bias current driving unit 14, a reference voltage generation unit 16, a resistance 18, a DC power source 19, a peak detection unit 24, a comparator 25 and a signal driving unit 26 are the same as those of FIG. 7. Further, the LD driving device shown in FIG. 8 is provided with a pulse pattern controlling unit 29 and a high-speed pulse controlling unit 30.

The pulse pattern controlling unit 29 is a driving control unit for controlling the high-speed pulse controlling unit 30 in response to the controlling signal inputted from the outside. The high-speed pulse controlling unit 30 controls, in an on-off manner, the current which is supplied to the LD 11 from the DC power source 19 at the sufficiently short period in comparison with the signal data, to pulse the current into a pulse line of the fixed pulse width. In the high-speed pulse controlling unit 30, the pulse density of the pulse line is controlled variably by the pulse pattern controlling unit 29.

The action of the LD driving device shown in FIG. 8 will be described concretely.

When the LD 11 emits light, the light of the LD 11 is detected by the PD 12 for monitoring and the optical voltage corresponding to the optical intensity of the LD 11 is generated between the terminals of the resistance 8. The peak value of the optical voltage is obtained in the peak detection unit 24. The reference voltage which has been set up previously in accordance with the desired peak output of the optical output is generated in the reference voltage generation unit 16. The peak value output of the peak detection unit 24 is compared with the output reference voltage of the reference voltage generation unit 16 in the comparator 25, and the signal corresponding to the difference is supplied to the signal driving unit 26.

The current which is supplied to the LD 11 from the DC power source 19 is controlled in an on-off manner to be pulsed by the high-speed pulse controlling unit 30 at the sufficiently short period in comparison with the signal data of the binary data to be transmitted. In the high-speed pulse controlling unit 30, the pulse density of the pulse line is controlled variably by the pulse pattern controlling unit 29. The pulse pattern controlling unit 29 operates in accordance with the controlling signal supplied from the outside. The required mean output power is determined by the controlling signal.

The signal driving unit 26, controls in an on-off manner, multiply-controls the DC current which is supplied to the LD 11 through the high-speed pulse controlling unit 28 from the DC power source 19 in accordance with the signal data input to be transmitted, and makes it function as a signal pulse current. The signal driving unit 26 controls the amplitude of the current supplied to the LD 11 so as to decrease it and reduce the mean value output, when the peak value output of the peak detection unit 15 is larger than the output reference voltage of the reference voltage generation unit 16. The signal driving unit 26 controls the amplitude of the current supplied to the LD 11 so as to increase it and enlarge the mean value output, when the peak value output is smaller than the output reference voltage.

As mentioned hereinbefore, the LD driving device shown in FIG. 8 comprises the peak detection unit 24, the comparator 25, the signal driving unit 26, the pulse pattern controlling unit 29 and the high-speed pulse controlling unit 30, and the mean optical output power of the LD 11 can be kept at the value which has been set up previously, by controlling, in an on-off manner, the light emitting element at the pulse of the sufficiently quick period in comparison with the driving current based on the signal data input when the LD 11 emits light and controlling the pulse width duty of the pulse, and the mean output of the LD 11 can be kept at the fixed output by controlling the amplitude of the driving current of the LD 11 in accordance with the result obtained by comparing the peak value of the output of the PD 12 for monitoring with the reference value.

Figure 9:
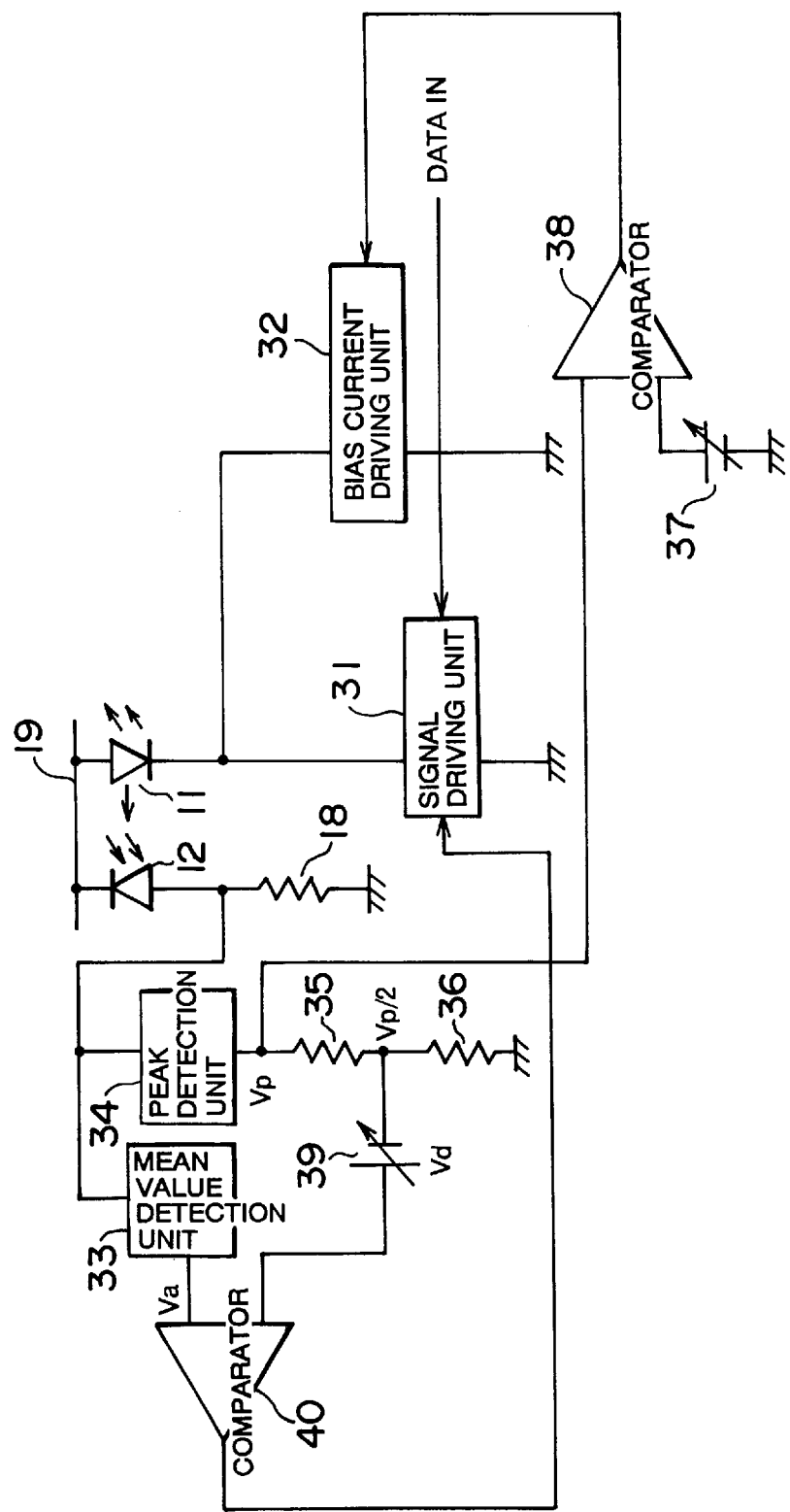
FIG. 9 is a block diagram indicating a construction of a device for driving a light emitting element of the fifth embodiment of the present invention.

FIG. 9 indicates a construction of the fifth embodiment of the LD driving device to which the device for driving a light emitting element according to the present invention has been applied.

In FIG. 9, the detailed descriptions concerning the same parts as those of FIG. 1 will be omitted by giving the identical numbers to them. Namely, a LD 11, a PD 12 for monitoring, a resistance 18 and a DC power source 19 are the same as those of FIG. 1. Further, the LD driving device shown in FIG. 9 comprises a signal driving unit 31, a bias current driving unit 32, a mean value detection unit 33, a peak detection unit 34, resistances 35 and 36 for dividing voltage, a first reference voltage generation unit 37, a first comparator 38, a second reference voltage generation unit 39 and a second comparator 40.

The signal driving unit 31 drives, in an on-off manner, the current which is supplied from the DC power source 19 so as to drive the LD 11 in accordance with the signal data input (DATA IN) supplied from the outside. In this case, the signal driving unit 31 controls the amplitude of the driving current for the LD 11 in accordance with the signal supplied from the second comparator 40.

The bias current driving unit 32 biases the current which is supplied to the LD 11 from the DC power source 19 by the predetermined bias value, and controls variably the predetermined bias value in accordance with the controlling signal supplied from the second comparator 40. Specifically, the bias current driving unit 14 controls the bias value on the basis of the result obtained by comparing a peak voltage Vp obtained in the peak detection unit 34, the resistances 35 and 36 for dividing voltage with the first reference voltage obtained in the first reference voltage generation unit 38 in the first comparator 38, to control the bias value at the value corresponding to the peak voltage Vp.

The mean value detection unit 33 detects a mean value Va of the current corresponding to the light emitting intensity of the LD 11 which is detected by the PD 12 for monitoring and appears between the terminals of the resistance 18, and supplies the mean voltage Va to the second comparator 40.

The peak detection unit 34 detects the peak voltage Vp which is a peak value corresponding to the light emitting intensity of the LD 11 which is detected by the PD 12 for monitoring and appears between the terminals of the resistance 18. The peak voltage Vp is divided by the resistances 35 and 36 for dividing voltage to obtain a Vp/2.

The second reference voltage generation unit 39 generates a second reference voltage Vd corresponding to the value of "L" (low level) of the driving current of the LD 11, adds the second reference voltage Vd to Vp/2 and supplies it to the second comparator 40. The second comparator 40 compares the voltage [(Vp/2)+Vd] supplied from the second reference voltage generation unit 39 with the mean voltage Va supplied from the mean value detection unit 15 and supplies the comparison result to the signal driving unit 31.

Accordingly, the signal driving unit 31 controls the mean value Va of the voltage corresponding to the light emitting intensity of the LD 11 which is detected by the PD 12 for monitoring and appears between the terminals of the resistance 18 so as to conform it to the voltage [(Vp/2)+Vd] obtained in the second reference voltage generation unit 39.

The action of the LD driving device shown in FIG. 9 will be described concretely.

When the LD 11 emits light, the light of the LD 11 is detected by the PD 12 for monitoring and the optical voltage corresponding to the light emitting intensity of the LD 11 is generated between the terminals of the resistance 18. The mean value Va of the optical voltage is obtained in the mean value detection unit 33. Besides, the peak value Vp of the optical voltage is obtained in the peak detection unit 34. The peak voltage Vp obtained in the peak detection unit 34 is compared with the first reference voltage generated in the first reference voltage generation unit 37 in the first comparator 38, and the bias current driving unit 32 is controlled by the result. The bias current driving unit 32 controls the bias value at the value corresponding to the peak voltage Vp.

The mean voltage Va output of the mean value detection unit 33 is compared with the output voltage [(Vp/2)+Vd] of the first reference voltage generation unit 39 in the second comparator 40, and the signal corresponding to the difference is supplied to the signal driving unit 31.

The signal driving unit 31 controls in an on-off manner, namely, multiply-controls the DC current which is supplied to the LD 11 from the DC power source 19 in accordance with the signal data input to be transmitted and makes it function as a signal pulse current, and the signal driving unit 31 controls the mean voltage Va so as to conform it to the voltage [(Vp/2)+Vd] obtained in the second reference voltage generation unit 39.

Namely, the bias value of the DC current is controlled by the bias current driving unit 32 and the first comparator 38 so that the peak value Vp of the output voltage of the PD 12 for monitoring is equal to the first reference voltage.

The amplitude of the driving current of the LD 11 is controlled so that the difference between the mean voltage Va and the voltage Vp/2 becomes equal to the second reference voltage Vd, by comparing the mean voltage Va of the output of the PD 12 for monitoring with the voltage [(Vp/2)+Vd] in which the second reference voltage Vd has been added to the half of the peak voltage Vp of the output of the PD 12 for monitoring in the second comparator 40 and controlling the amplitude of the signal driving unit 31 by the comparison result.

Figure 10:
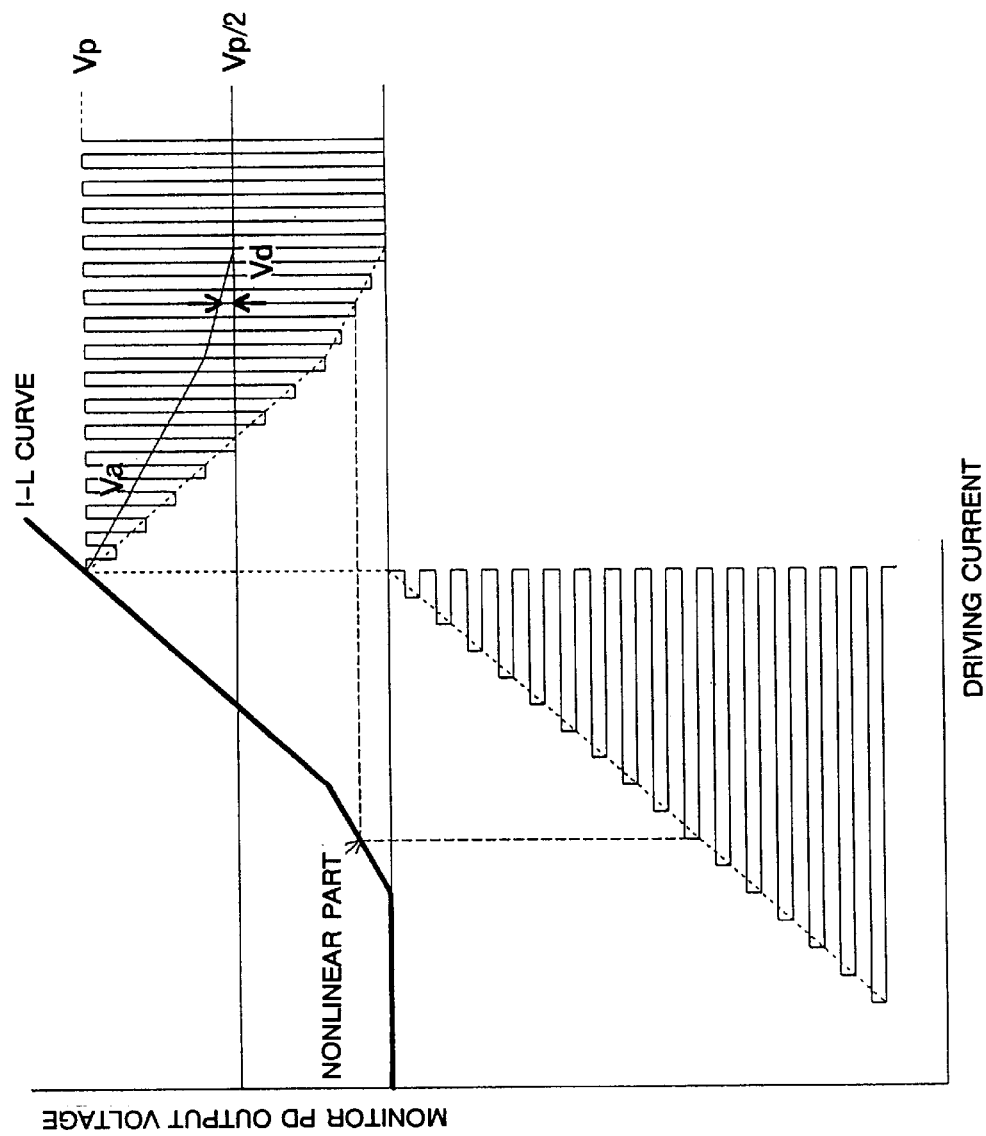
FIG. 10 is a diagram for explaining the action of the device shown in FIG. 9 and indicating the relationship between the driving current and the output voltage of the PD for monitoring.

By these actions, the value of "L" of the driving current of the LD 11 can be controlled in the vicinity of the threshold, for instance, in the nonlinear part of I-L curve shown in FIG. 10, indicating the relationship between the driving current and the output voltage of PD 12 for monitoring (the second reference voltage Vd is set up by making it correspond to the voltage in the vicinity of the threshold beforehand). The bias current when the LD 11 emits light a little (when the data signal is controlled in the OFF state) can be kept in the vicinity of the threshold automatically by keeping the mean voltage Va at the half of the peak voltage Vp, namely, at the value which is a little larger than the Vp/2, because the mean voltage Va depends on the bias current.

Namely, when the driving current of the LD 11 is larger than the threshold, the driving current is related almost linearly to the output voltage of the PD 12 for monitoring. The relationship between the driving current of the LD 11 and the output voltage of the PD 12 for monitoring is nonlinear if the driving current is reduced to be brought close to the threshold, and the output voltage of the PD 12 for monitoring is almost constant if the driving current is less than the threshold voltage. If the value in the vicinity of the threshold such as the nonlinear part is detected, the bias current can be kept in the vicinity of the threshold current automatically even when the threshold voltage is fluctuated by temperature, and the temperature compensation control is needles.

Figure 11:
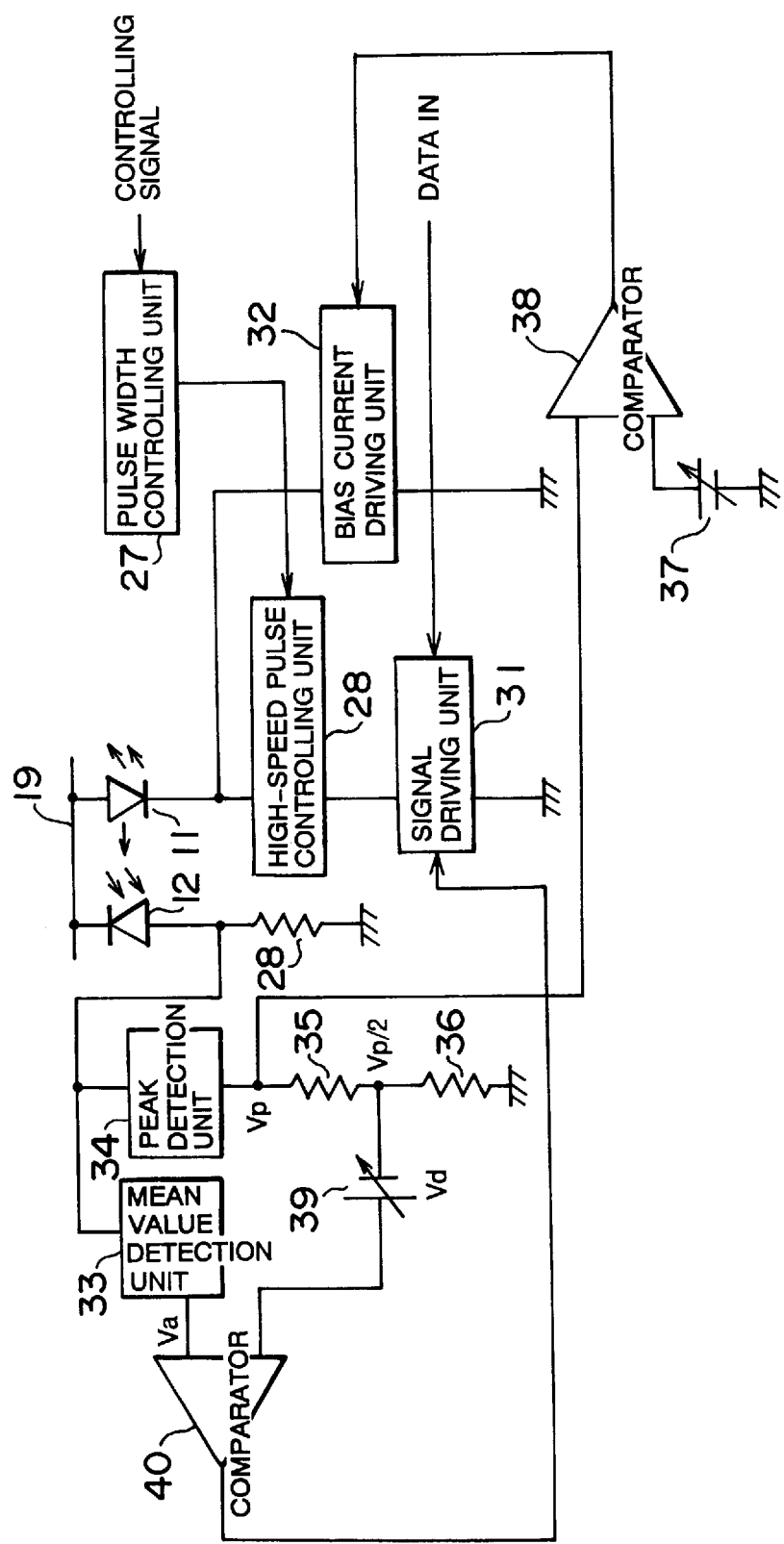
FIG. 11 is a block diagram indicating a construction of a device for driving a light emitting element of the sixth embodiment of the present invention.

FIG. 11 indicates a construction of the sixth embodiment of the LD driving device to which the device for driving teh light emitting element according to the present invention has been applied.

In FIG. 11, the detailed descriptions concerning the same parts as those of FIG. 9 will be omitted by giving the identical numbers to them. In the LD driving device shown in FIG. 11, a pulse width controlling unit 27 and a high-speed pulse controlling unit 28 which are the same as those shown in FIG. 7 are added to the construction of FIG. 9.

The pulse width controlling unit 27 is a driving control unit for controlling the high-speed pulse controlling unit 28 in response to the controlling signal inputted from the outside. The high-speed pulse controlling unit 28 controls, in an on-off manner, the current which is supplied to the LD 11 from the DC power source 19 at the sufficiently short period in comparison with the signal data to pulse the current. In the high-speed pulse controlling unit 28, the pulse width duty ratio of the pulse is controlled variably by the pulse width controlling unit 27.

The current which is supplied to the LD 11 from the DC power source 19 is controlled in an on-off manner to be pulsed by the high-speed pulse controlling unit 28 at the sufficiently short period in comparison with the signal data of the binary data to be transmitted. In the pulse width controlling unit 28, the pulse width duty is controlled variably by the pulse width controlling unit 27. The pulse width controlling unit 27 operates in accordance with the controlling signal supplied from the outside. The required mean output power is determined by the controlling signal.

As mentioned hereinbefore, in the LD driving device shown in FIG. 11, the mean optical output of the LD 11 can be kept at the value which has been set up previously, by controlling, in an on-off manner, the light emitting element at the sufficiently quick period in comparison with the driving current based on the signal data input when the LD 11 emits light and controlling the pulse width duty of the pulse, and the mean output of the LD 11 can be kept at the predetermined value by controlling the bias current in the same way as shown in FIG. 9. Besides, the temperature compensation control is needless.

Figure 12:
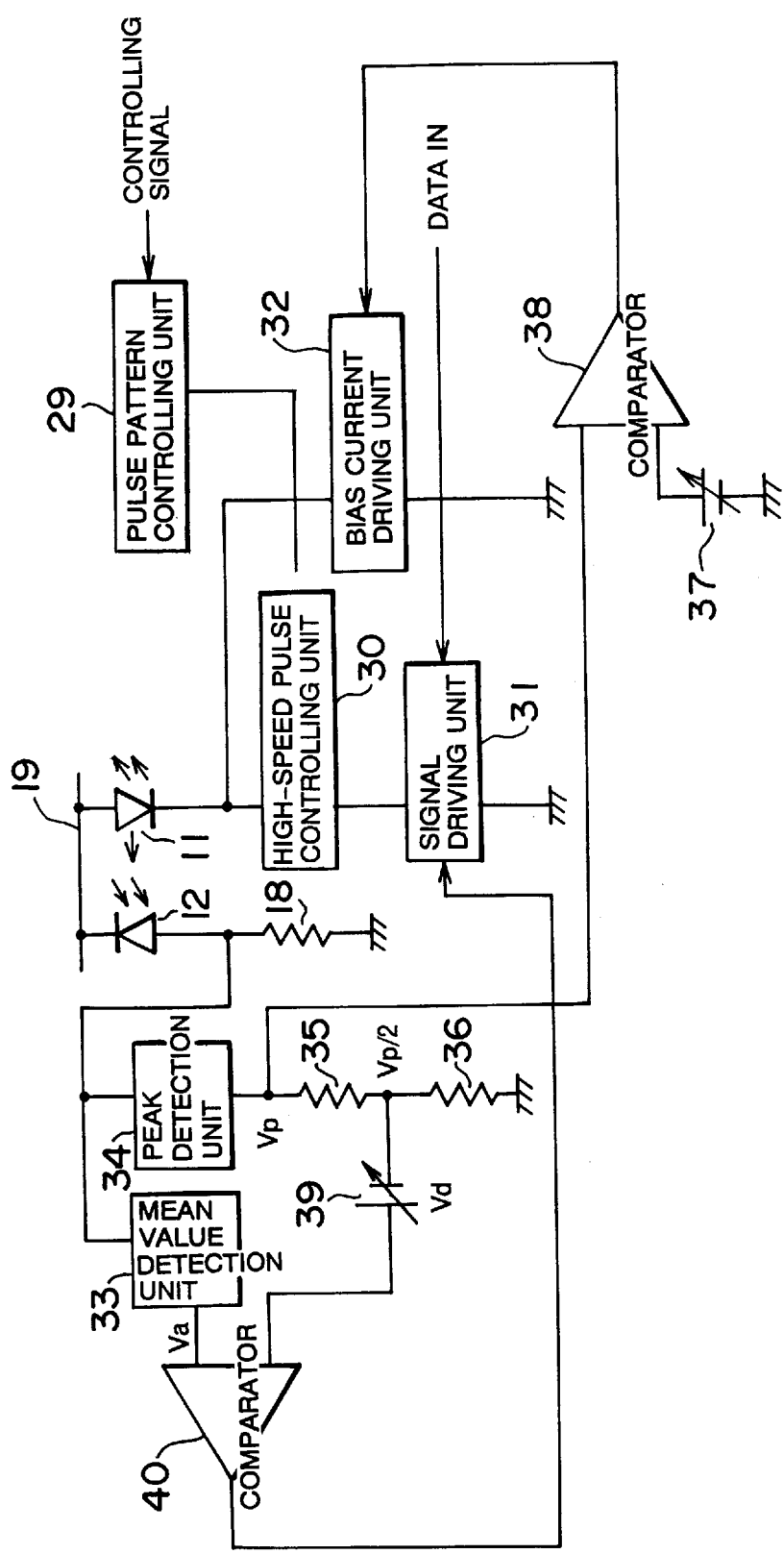
FIG. 12 is a block diagram indicating a construction of a device for driving a light emitting element of the seventh embodiment of the present invention.
Figure 13:
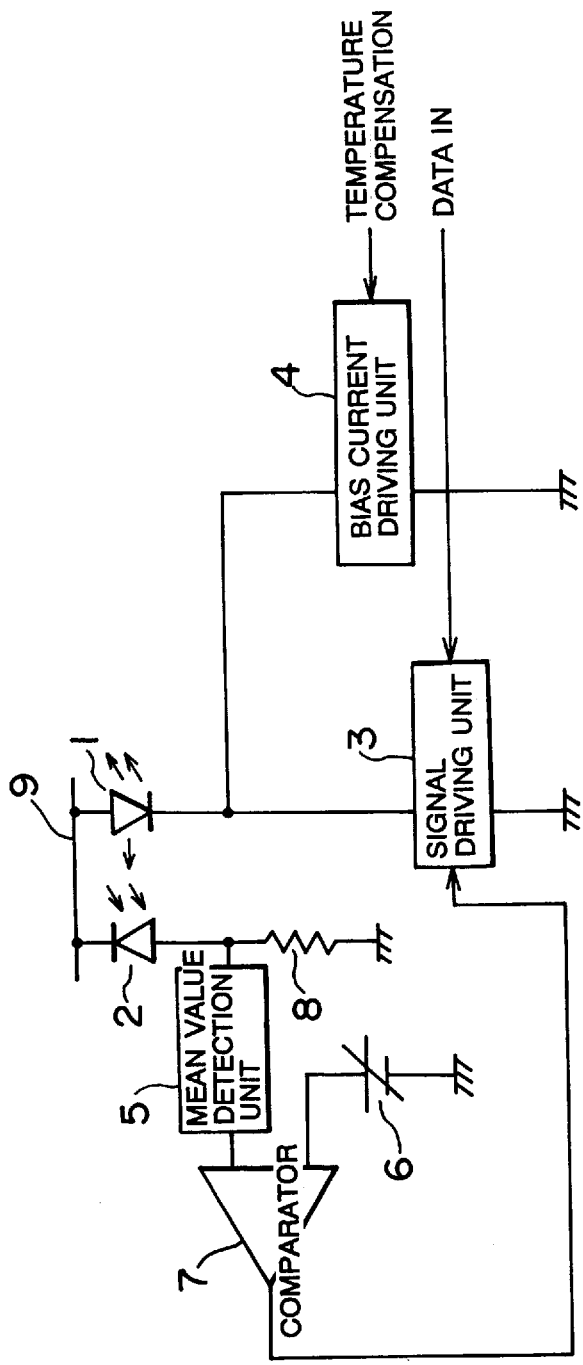
FIG. 13 is a block diagram indicating a construction of one example of a conventional device for driving a light emitting element.

FIG. 12 indicates a construction of the seventh embodiment of the LD driving device to which the device for driving the light emitting element according to the present invention has been applied.

In FIG. 12, the detailed descriptions concerning the same parts as those of FIG. 9 will be omitted by giving the identical numbers to them. In the LD driving device shown in FIG. 12, the pulse pattern controlling unit 29 and the high-speed pulse controlling unit 30 which are the same as those shown in FIG. 8 are added to the construction of FIG. 9.

The pulse pattern controlling unit 29 is a driving control unit for controlling the high-speed pulse controlling unit in response to the controlling signal inputted from the outside. The high-speed pulse controlling unit 30 controls, in an on-off manner, the current which is supplied to the LD 11 from the DC power source 19 at the sufficiently short period in comparison with the signal data to pulse the current. In the high-speed pulse controlling unit 28, the pulse density of the pulse line is controlled variably by the pulse pattern controlling unit 29.

The current which is supplied to the LD 11 from the DC power source 19 is controlled in an on-off manner to be pulsed by the high-speed pulse controlling unit 30 at the sufficiently short period in comparison with the signal data of the binary data to be transmitted. In the high-speed controlling unit 30, the pulse density is controlled variably by the pulse pattern controlling unit 29. The pulse pattern controlling unit 29 operates in accordance with the controlling signal supplied from the outside. The required mean output power is determined by the controlling signal.

As mentioned hereinbefore, in the LD driving device shown in FIG. 12, the mean optical output power can be kept at the value which has been set up previously by controlling, in an on-off manner, the light emitting element at the sufficiently quick period in comparison with the driving current based on the signal data input when the LD 11 emits light and controlling the pulse density of the pulse, and the mean output of the LD 11 can be kept at the predetermined value by controlling the bias current of the LD 11 in the same way as shown in FIG. 9. Besides, the temperature compensation control is needless.

As a matter of course, the present invention also can be performed in almost the same way as the above-mentioned way, even when the light emitting element other than the LD such as a light emitting diode is used, and even when the light receiving element other than the PD such as a photo transistor is used for monitoring.

As described hereinbefore, according to the present invention, the light emitting element such as the LD can be driven appropriately for various output powers without controlling the peak value of the driving current, and the device for driving the light emitting element in which the light emitting element for large output can be applied to uses for small output can be provided.

What is claimed is:

1. A device to drive a light emitting element, comprising:
   a DC power source to generate a DC current;
   a signal driving unit to control, in an on-off manner, the DC current being generated by the DC power source in accordance with timing of signal data,
   the light emitting element being driven by the DC current controlled in the on-off manner by said signal driving unit and emitting light when the DC current flows therethrough;
   a high-speed pulse controlling unit to further control, in an on-off manner, the DC current which drives the light emitting element at a sufficiently short period in comparison with the signal data to pulse the DC current; and
   a driving control unit to adjust a timing of the on-off manner of said high-speed pulse controlling unit in accordance with a required mean optical output of the light emitting element.

2. A device to drive a light emitting element, according to claim 1, wherein said high-speed pulse controlling unit pulses the DC current which drives the light emitting element by controlling, in the on-off manner, the DC current which is supplied to said signal driving unit from the DC power source at the sufficiently short period in comparison with the signal data to pulse the DC current.

3. A device to drive a light emitting element according to claim 1, wherein said high-speed pulse controlling unit pulses the DC current which drives the light emitting element by controlling, in the on-off manner, the DC current which is supplied to the light emitting element from said signal driving unit at the sufficiently short period in comparison with the signal data to pulse the DC current.

4. A device to drive a light emitting element according to claim 1, wherein said signal driving unit controls, in the on-off manner, the DC current at an amplitude and with timing in accordance with the signal data.

5. A device to drive a light emitting element according to claim 1, wherein said driving control unit comprises a pulse width controlling unit to variably adjust a pulse width duty ratio of said high-speed pulse controlling unit to pulse the DC current.

6. A device to drive a light emitting element according to claim 1, wherein said driving control unit comprises a pulse pattern controlling unit to variably adjust a pulse pattern of said high-speed pulse controlling unit to pulse the DC current.

7. A device to drive a light emitting element according to claim 6, wherein said pulse pattern controlling unit comprises a pulse density controlling unit to select and extract intermittently a pulse in a high frequency pulse line formed by said high-speed pulse controlling unit and to adjust variably a pulse density of the pulse to be extracted.

8. A device to drive a light emitting element according to claim 6, wherein said pulse pattern controlling unit comprises a pulse number controlling unit to select and extract intermittently a pulse in a high frequency pulse line formed by said high-speed pulse controlling unit at a predetermined period and to change variably a pulse number per period of the pulse to be extracted to pulse the DC current.

9. A device to drive a light emitting element according to claim 1, further comprising:
   a light receiving element to detect an optical output of the light emitting element;
   a mean value detection unit to detect a mean value of the output of the light receiving element; and
   a comparison unit to compare the mean value with a reference value, wherein said driving control unit controls said high-speed pulse controlling unit in accordance with a comparison result of said comparison unit.

10. A device to drive a light emitting element according to claim 4, further comprising:

a light receiving element to detect an optical output of the light emitting element;

a peak value detection unit to detect a peak value of an output of the light receiving element; and a comparison unit to compare the peak value with a reference value, wherein said signal driving unit controls the amplitude of the DC current which is supplied to the light emitting element in accordance with a comparison result of said comparison unit.

11. A device to drive a light emitting element according to claim 1, further comprising:

a bias current driving unit to supply a predetermined bias current to the light emitting element from the DC power source independent of said signal driving unit and said driving control unit.

12. A device to drive a light emitting element according to claim 11, wherein said bias current driving unit controls variably a bias current in accordance with a temperature compensation signal.

13. A device to drive a light emitting element according to claim 4, further comprising:

a light receiving element to detect an optical output of the light emitting element;

a mean value detection unit to detect a mean value of the output of the light receiving element;

a peak value detection unit to detect a peak value of the output of the light receiving element;

a first reference value generation unit to generate a predetermined first reference value;

a first comparison unit to compare the peak value with the first reference value, to generate a first comparison result;

a bias current driving unit to supply a predetermined bias current to the light emitting element from the DC power source independent of said signal driving unit and said driving control unit, in accordance with the first comparison result of said first comparison unit;

a ½ calculation unit to calculate a ½ (half) peak value corresponding to ½ (half) of the peak value;

a second reference value generation unit to add a predetermined second reference value to the ½ (half) peak value; and a second comparison unit to compare the mean value with the ½ (half) peak value to which the second reference value has been added, to generate a second comparison result;

wherein said signal driving unit controls the amplitude of the DC current which is supplied to the light emitting element in accordance with the second comparison result of said second comparison unit.

14. A device to drive a light emitting element according to claim 1, wherein said driving control unit controls said high-speed pulse controlling unit in accordance with a controlling signal supplied from the outside.

15. A device to drive a light emitting element according to claim 1, wherein the light emitting element is a laser diode.

16. A device to drive a light emitting element according to claim 9, wherein the light receiving element is a photodiode.

17. A device to drive a light emitting element according to claim 10, wherein the light receiving element is a photodiode.

18. A device to drive a light emitting element according to claim 13, wherein the light receiving element is a photodiode.

19. A device to drive a light emitting element, comprising:

a DC power source to generate a DC current;

a signal driving unit to control, in an on-off manner, the DC current generated by the DC power source at an amplitude and with timing in accordance with the signal data, wherein the light emitting element is driven by the DC current controlled in the on-off manner by said signal driving unit and emits light when the DC current flows therethrough;

a light receiving element to detect an optical output of the light emitting element;

a mean value detection unit to detect a mean value of the output of the light receiving element;

a peak value detection unit, to detect a peak value of the output of the light receiving element;

a first reference value generation unit to generate a predetermined first reference value;

a first comparison unit to compare the peak value with the first reference value, to generate a first comparison result;

a bias current driving unit to supply a predetermined bias current to the light emitting element from the DC power source independent of said signal driving unit, in accordance with the first comparison result of said first comparison unit;

a ½ (half) calculation unit to calculate a ½ (half) peak value corresponding to ½ (half) of the peak value;

a second reference value generation unit to add a predetermined second reference value to the +e,fra 1/+ee (half) peak value; and a second comparison unit to compare the mean value with the ½ (half) peak value to which the second reference value has been added to generate a second comparison result, and to control said signal driving unit in accordance with the second comparison result so the amplitude of the DC current which is supplied to the light emitting element has a value corresponding to the comparison result.

20. A device to drive a light emitting element according to claim 19, wherein the light emitting element is a laser diode.

21. A device to drive a light emitting element according to claim 19, wherein the light receiving element is a photodiode.

* * * * *

UNITED STATES PATENT AND TRADEMARK OFFICE
CERTIFICATE OF CORRECTION

PATENT NO. : 5,835,250
DATED : November 10, 1998
INVENTOR(S) : Kanesaka

It is certified that error appears in the above-identified patent and that said Letters Patent is hereby corrected as shown below:

Col. 2, line 26, "manhour" should be --manhours--.

Col. 8, line 67, delete "the" (second occurrence).

Col. 12, line 15, delete "controls".

Col. 17, line 46, after "1\2" insert --(half)--.

Col. 18, line 46, "+e,fra 1/+cc" should be --1/2--.

Signed and Sealed this

Twenty-ninth Day of June, 1999

Attest:

Q. TODD DICKINSON

Attesting Officer

Acting Commissioner of Patents and Trademarks